United States Patent
Zhang et al.

(10) Patent No.: US 11,983,562 B2
(45) Date of Patent: May 14, 2024

(54) MULTIDIMENSIONAL RESOURCE SCHEDULING METHOD IN KUBERNETES CLUSTER ARCHITECTURE SYSTEM

(71) Applicant: NANJING UNIVERSITY OF POSTS AND TELECOMMUNICATIONS, Jiangsu (CN)

(72) Inventors: Dengyin Zhang, Jiangsu (CN); Lin Zhu, Jiangsu (CN); Junjiang Li, Jiangsu (CN); Zijie Liu, Jiangsu (CN); Chengwan Ai, Jiangsu (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 454 days.

(21) Appl. No.: 17/395,728

(22) Filed: Aug. 6, 2021

(65) Prior Publication Data

US 2021/0365290 A1 Nov. 25, 2021

Related U.S. Application Data

(63) Continuation of application No. PCT/CN2021/072398, filed on Jan. 18, 2021.

(51) Int. Cl.
*G06F 9/50* (2006.01)
*G06F 9/54* (2006.01)
*G06F 16/28* (2019.01)

(52) U.S. Cl.
CPC ............ *G06F 9/5005* (2013.01); *G06F 9/547* (2013.01); *G06F 16/285* (2019.01)

(58) Field of Classification Search
None
See application file for complete search history.

(56) References Cited

U.S. PATENT DOCUMENTS

| | | | | |
|---|---|---|---|---|
| 10,191,778 | B1 * | 1/2019 | Yang | G06F 11/301 |
| 10,514,951 | B2 * | 12/2019 | Bahramshahry | G06F 9/5038 |
| 10,545,796 | B2 * | 1/2020 | Bahramshahry | G06F 9/505 |
| 11,243,807 | B2 * | 2/2022 | Bahramshahry | G06F 9/4881 |
| 11,294,726 | B2 * | 4/2022 | Bahramshahry | G06F 9/5044 |
| 11,392,422 | B1 * | 7/2022 | Filiz | G06F 9/45558 |
| 11,422,844 | B1 * | 8/2022 | Filiz | G06F 9/45558 |

OTHER PUBLICATIONS

Beltre et al "KubeSphere: An Approach to Multi-Tenant Fair Scheduling for Kubernetes Clusters", 2019 IEEE, pp. 14-20.*
Fu et al "Progress-based Container Scheduling for Short-lived Applications in a Kubernetes Cluster", 2019 IEEE, pp. 278-287.*
Lepakshi et al "Efficient Resource Allocation with Score for Reliable Task Scheduling in Cloud Computing Systems", 2020 IEEE, pp. 6-11.*

* cited by examiner

*Primary Examiner* — Van H Nguyen

(57) ABSTRACT

A multidimensional resource scheduling method in a Kubernetes cluster architecture system is provided. For a computing-intensive service, each server node in the cluster is scored according to CPU idleness and memory idleness; for an ordinary service, each server node in the cluster is scored according to resource requirements of a scheduling task, a resource priority of each server node and resource balance of each server node. The pod scheduling task is bound to a server node with a highest score for execution. This scheduling method meets diverse resource requests of various services, thereby enhancing the flexibility and expandability of the system.

7 Claims, 2 Drawing Sheets

MULTIDIMENSIONAL RESOURCE SCHEDULING METHOD IN KUBERNETES CLUSTER ARCHITECTURE SYSTEM

CROSS REFERENCE TO RELATED APPLICATION

The present disclosure claims priority to the Chinese Patent Application No. 202010300356.2, entitled "MULTIDIMENSIONAL RESOURCE SCHEDULING METHOD IN KUBERNETES CLUSTER ARCHITECTURE SYSTEM" filed with the China National Intellectual Property Administration (CNIPA) on Apr. 16, 2020, which is incorporated herein by reference in its entirety.

TECHNICAL FIELD

The present disclosure relates to a technical field of Internet communication, in particular to a multidimensional resource scheduling method in a Kubernetes cluster architecture system.

BACKGROUND

With a booming development of various technologies such as cloud computing, distributed storage, a Kubernetes cluster architecture system has become more popular in the technical field of Internet communications due to the characteristics of low cost, high efficiency and lightweight testing. A Kubernetes container cluster management tool is mainly applied to management of computing-intensive large-scale task applications in a cloud computing environment. However, container resource requests change dynamically, and there are other resources such as a storage and network bandwidth in addition to CPU and memory. Request types are diverse, and the corresponding resource types are also multidimensional. However, the static scheduling algorithm of Kubernetes has fixed input parameters, and analyzes resource occupancy roughly, which is greatly limited, failing to utilize various resources in the servers (including heterogeneous resources in edge nodes of the architecture), and failing to provide appropriate help for multidimensional resource requests of containers. The existing scheduling algorithm cannot meet the requirements of scheduling multidimensional resources.

SUMMARY

In view of the above, the present disclosure provides a multidimensional resource scheduling method in a Kubernetes cluster architecture system which can dynamically allocate an optimal work node to each task in a cloud system, thereby solving the problem that the existing scheduling algorithm has fixed input parameters and cannot meet the requirements of the tasks for diverse resource types of nodes.

To achieve the above effect, the present disclosure provides the following solutions:

A multidimensional resource scheduling method in a Kubernetes cluster architecture system includes:
  initiating Pod creation requests;
  obtaining parameters required by Pods to generate Pod scheduling tasks;
  serializing the Pod scheduling tasks as objects to send to a scheduler; and
  binding each Pod scheduling task in the scheduler to a target node for execution.

In an embodiment, the initiated Pod creation requests specifically include:
  a request initiated via a kubectl client command line;
  a Pod request created by a controller for making up copies; and
  an external request initiated by an Api Server.

In an embodiment, the method further includes:
  authenticating the Pod creation requests and sending the Pod creation requests to an Api Server of a cluster master node, for the Api Server to create corresponding Pods.

In an embodiment, the method further includes:
  persistently storing all Pod creation information in a distributed storage database etcd.

In an embodiment, the serializing the Pod scheduling tasks as objects to send to a scheduler includes:
  calculating priority indexes of the Pod scheduling tasks, sorting the Pod scheduling tasks in descending order according to the priority indexes to form a first-in-first-out queue, and sending the Pod scheduling tasks to the scheduler according to a sequence of the queue;
  the priority index is calculated as follows:

$$\alpha_i = \frac{D_i - A_i}{CP_i};$$

where $\alpha_i$ denotes a priority index of an $i^{th}$ Pod scheduling task, $D_i$ denotes a deadline constraint of the $i^{th}$ Pod scheduling task, $A_i$ denotes submission time of the $i^{th}$ Pod scheduling task, and $CP_i$ denotes a critical path length of the $i^{th}$ Pod scheduling task.

In an embodiment, the binding each Pod scheduling task in the scheduler to the target node for execution specifically includes:
  performing a feasibility check on server nodes, to pick out server nodes capable of running the Pod scheduling task;
  scoring the server nodes capable of running the Pod scheduling task; and
  binding the Pod scheduling task to a server node with a highest score.

In an embodiment, the server nodes are picked out by using a default filtering algorithm of Kubernetes:
  filtering out server nodes on which ports required by the Pod have been occupied,
  filtering out server nodes that cannot meet resources required by the Pod,
  filtering out server nodes that conflict with a disk volume label in the Pod, and
  picking out server nodes matching a Pod NodeSelector attribute and HostName.

In an embodiment, the scoring the server nodes capable of running the Pod scheduling task specifically includes:
  determining whether a current Pod scheduling task event is a computing-intensive service or an ordinary service; scoring each server node in the cluster according to CPU idleness and memory idleness if the current Pod scheduling task event is the computing-intensive service; scoring each server node in the cluster according to resource requirements of the Pod scheduling task, a resource priority of each server node, and resource balance of each server node if the current Pod scheduling task event is the ordinary service.

In an embodiment, the scoring each server node in the cluster according to resource idleness specifically includes:

$$\text{score} = \frac{10\text{cpu}(\text{capacity} - \text{sum}(\text{requested}))}{\text{capacity}} +$$
$$\frac{10\text{memory}(\text{capacity} - \text{sum}(\text{requested}))}{2\text{capacity}};$$

where score denotes a score of the server node, cpu denotes CPU idleness, memory denotes memory idleness, capacity denotes a total amount of resources corresponding to the server node, and requested denotes an amount of resources occupied by other running tasks of the server node.

In an embodiment, the scoring each server node in the cluster according to the resource requirements of the Pod scheduling task, the resource priority of each server node, and the resource balance of each server node specifically includes:

calculating the resource priority of each server node:

$$W_{ij} = T_{ij} - T_{ijused} - T_{ijreq};$$

$$G_i = \frac{W_{ij} * C_i}{s};$$

where $T_{ij}$ denotes a total amount of type-j resources of an $i^{th}$ server node in the cluster, $W_{ij}$ denotes a priority of the type-j resources of the $i^{th}$ server node in the cluster, $T_{ijused}$ denotes a total amount of the type-j resources consumed by deployed Pods and other applications of the firth server node in the cluster, $T_{ijreg}$ denotes an amount of the type-j resources requested by a current Pod task to be scheduled, $G_i$ denotes a resource priority of the $i^{th}$ server node, $C_i$ denotes a resource weight factor of the $i^{th}$ server node, i=1, 2 . . . k, j=1, 2 . . . s, k denotes the number of the server nodes, s denotes a total number of resource types in the server node, and the resource types include cpu, memory, i/o read/write rate, network bandwidth, graphics card and hard disk; calculating the resource balance of each server node:

$$B_i = \frac{\sum_{j=1}^{S}\sum_{l=1}^{S}[1 - \text{abs}(W_{ij} - W_{il})]}{S * S};$$

where $B_i$ denotes the resource balance of the $i^{th}$ server node;

scoring each server node:

$$S_{corei} = K(G_i + B_i)$$

where $S_{corei}$ denotes a score of the $i^{th}$ server node, K is +1 or −1, indicating a result after a filtering process, K=+1 if the server node remains after the filtering process, K=−1 if the server node is filtered out, a negative value of $S_{corei}$ indicates that the server node is not available, and a positive value of $S_{corei}$ indicates that the server node is available.

Based on specific embodiments provided by the present disclosure, the present disclosure has the following technical effects:

The present disclosure provides a multidimensional resource scheduling method in a Kubernetes cluster system, which can schedule various resources of nodes in the cluster, thereby meeting diverse resource requests of various services and enhancing the flexibility and expandability of the system.

BRIEF DESCRIPTION OF THE DRAWINGS

To describe the technical solutions in the embodiments of the present disclosure or in the conventional technology more clearly, the accompanying drawings used in the embodiments are briefly described below. It is obvious that the accompanying drawings in the following description show merely some embodiments of the present disclosure, and a person of ordinary skill in the art can still derive other accompanying drawings from these accompanying drawings without involving any inventive efforts.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The present disclosure intends to provide a multidimensional resource scheduling method in a Kubernetes cluster architecture system, which can dynamically allocate an optimal work node to each task in a cloud system, thereby solving the problem that the existing scheduling algorithm has fixed input parameters and cannot meet the requirements of the tasks for diverse resource types of nodes.

To make the foregoing objective, features, and advantages of the present disclosure clearer and more comprehensible, the present disclosure will be further described in detail below with reference to the accompanying drawings and specific embodiments.

Figure 1:
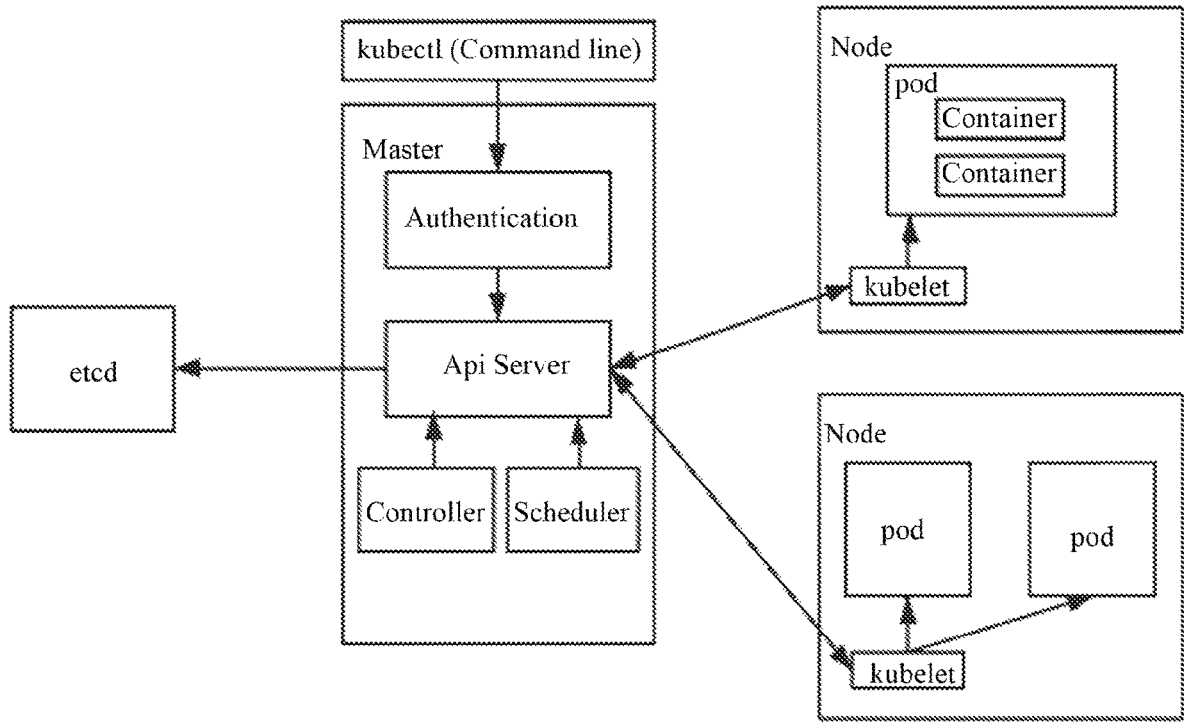
FIG. 1 is a framework diagram of a Kubernetes cluster architecture system according to the present disclosure.

Referring to FIG. 1, the Kubernetes cluster architecture system of the present disclosure is described as follows:

Cluster master node (Master): The Master as the core node of the whole cluster performs all execution command operations for the Kubernetes cluster, is responsible for the scheduling and management of the whole cluster, and is usually a separate server in the cluster. The Master includes many components, mainly including an Api Server, a controller and a scheduler. The Api Server is a data bus and data center of the whole system, providing addition, deletion, modification and query functions for various resource objects of the cluster system, REST API interfaces of cluster management (including authentication and authorization, data verification and cluster status change), and data interaction and communication between other modules. Other modules query or modify data through the Api Server, and only the Api Server operates the etcd directly. The controller as the internal management and control center of the cluster is responsible for obtaining related parameters such as a development dependency library and system configurations required by a user, generating tasks by using the parameters, and sending the tasks to the scheduler. The scheduler receives the tasks sent by the controller, monitors the Pod validity, finds a suitable node to run a Pod according to a scheduling policy, and sends binding information to the etcd for storage via the Api Server.

Node: In the Kubernetes cluster, all other nodes except for the cluster master node (Master) are called Nodes. All the Nodes are working nodes, and each Node as an executor of tasks is assigned an appropriate workload by the Master node according to the scheduling rule. Each Node runs a kubelet service process that listens to ports, receives and executes commands from the Master, and manages Pods and containers in the Pods. Each kubelet process registers node information with the Api Server, periodically reports the resource usage status to the Master node, and monitors the resources of the node and containers through cAdvisor.

Command line tool (kubectl): kubectl, which is usually installed on the client side, can manage the cluster and install and deploy containerized applications in the cluster. Kubectl as a command line tool for Kubernetes is mainly responsible for operating resource objects in the cluster. These operations include creating, deleting, and viewing the resource objects, thereby managing the Kubernetes cluster.

Distributed storage database (etcd): etcd is an important component of a Kubernetes cluster, which is used for storing all network configurations and state information of all objects in the cluster.

Based on the foregoing Kubernetes cluster architecture system, the present disclosure provides a multidimensional resource scheduling method in a Kubernetes cluster architecture system, which includes the following steps:

Step 1: Pod creation requests are initiated. Initiating the Pod creation requests including: a. initiating a request via a kubectl client command line; b. creating a Pod request by a controller for making up copies; c. initiating an external request by an Api Server.

All the Pod creation requests need to be authenticated and then sent to the Api Server of the cluster master node. It is determined whether the creation request is valid by authentication. If the Pod creation request is valid, the Api Server creates a corresponding Pod, and all Pod creation information is persistently stored in the distributed storage database etcd. The controller and scheduler in the cluster master node (Master) access the Api Server in real time to query the Pod creation information. When there is a new creation object, the controller is responsible for obtaining related parameters such as a development dependency library and system configurations required by the Pod, generating a Pod scheduling task and sending the task to the scheduler, and adding the Pod scheduling task to a pending queue at the same time. The controller serializes the Pod scheduling tasks as objects to send to the scheduler. The scheduler receives the tasks from the controller, monitors the validity of the tasks and schedules a program to scan the tasks asynchronously.

Step 2: A scheduler accesses the Api Server to query whether there is a Pod task to be scheduled. If there is a Pod task to be scheduled, Pod resource information to be scheduled and resource usage status of all Nodes in the cluster are obtained. Then the scheduler performs scheduling according to a formulated scheduling policy to bind the Pod task to a target node, and writes binding information into the etcd. If there is no Pod task to be scheduled, no operation is performed, to wait for the next round of notification query.

Pod creation information and required resource information are carried during submission of a Pod. The Pod creation information is used for building an environment during specific deployment of the Pod, and the resource information is the resources required for completing the scheduling task, e.g. computational resources such as cpu and memory, as well as diverse resources such as i/o read/write rate, network bandwidth, graphics card, hard disk. Such information is usually set in a yaml file of the Pod.

The scheduling policy consists of two phases as follows:

A preliminary selection phase: the feasibility check is mainly performed specifically as follows:

The scheduler filters out unqualified server nodes based on a filtering rule, and finds out server nodes capable of running the task.

A fine selection phase: priority scoring of the server nodes capable of running the task is conducted specifically as follows:

The server nodes that remain after the filtering in the previous phase are scored, a server node with a highest score is selected and bound to the Pod task, and a container is deployed on the corresponding node to run the task. If the node has enough available resources to meet the constraints of the operation, the scheduler program assigns the task to the node. Scanning is performed in descending order of priorities, and adjustment is carried out through a loop scheme for the same priority to ensure fairness among users and to avoid front-end blocking after large-scale operations.

The scheduling policy is specifically performed as follows:

popping up a scheduling event, i.e. a Pod task to be scheduled in the first-in-first-out scheduling queue, and entering a scheduling process;

determining a running port, resource requirements (e.g., cpu, memory, I/O read/write speed) and a series of customized requirements based on the scheduling event;

invoking a set of filtering algorithms to perform a feasibility check, filtering node information of all the nodes in the cluster within the cache of the scheduler to obtain a set of nodes that meet the requirements, i.e., a list of all server nodes capable of running the scheduling event, in which, server nodes whose available resources are less than those required by the task are filtered out; and scoring the server nodes in the list of server nodes capable of running the scheduling event.

The scheduling policy of the present disclosure takes into account the different resource type requests of each Pod and provides a specific scheduling service for each scheduling task. The final scheduling result is the server node with the highest score that is selected based on the requirements of the task and some overall optimization policies. Then the server node is bound to the scheduling task, and a container environment is deployed on the server node to run the task.

Step 3: Kubelet on the node makes regular visits, receives and executes scheduling tasks from the scheduler; when a new Pod is bound, Kubelet downloads a container mirror image required by the Pod and requests corresponding resources for the deployment of the Pod, and returns a result to the scheduler after execution. At the same time, Kubelet in the target node listens to scheduling information and is responsible for specific creation of a node.

Step 4: Kubelet obtains a latest state of the Pod according to a container start time and updates the new state to the etcd via the Api Server.

Figure 2:
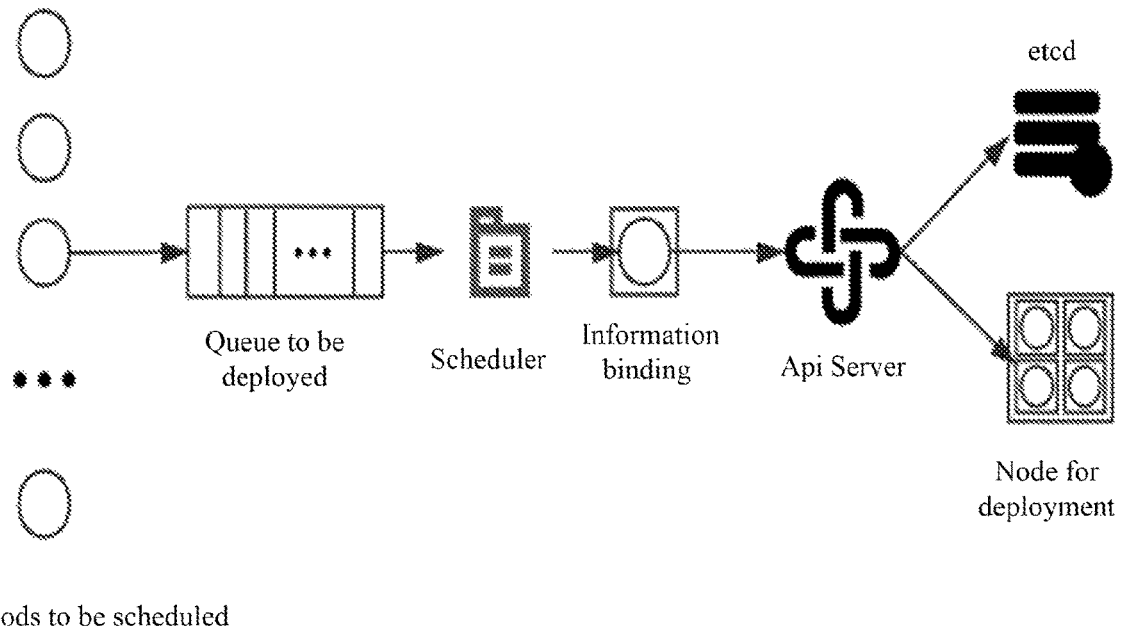
FIG. 2 is a physical flowchart of multidimensional resource scheduling in a Kubernetes cluster system according to the present disclosure.

The work flow of the Kubernetes cluster system during the scheduling process is shown in FIG. 2.

Figure 3:
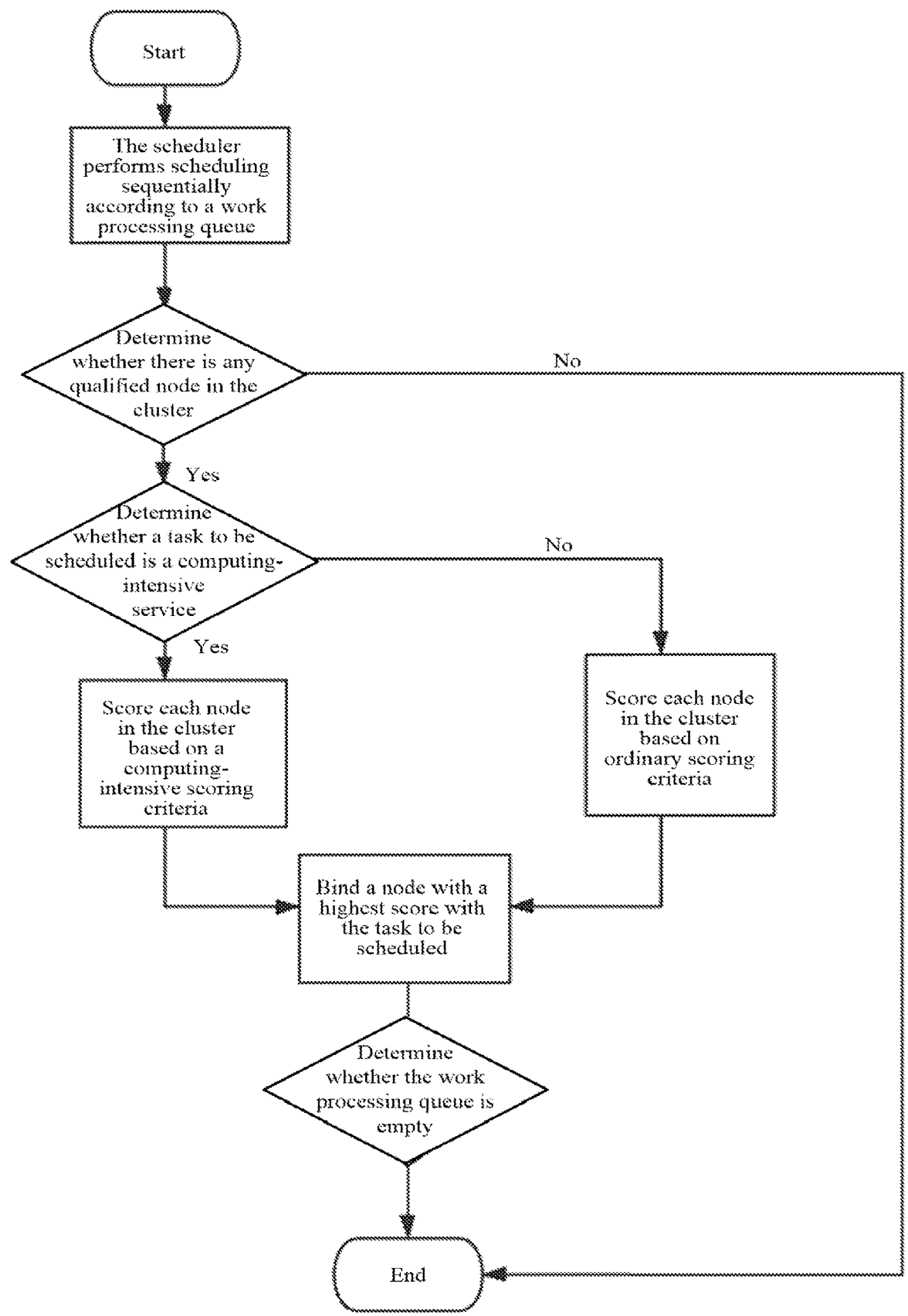
FIG. 3 is a flowchart of a multidimensional resource scheduling algorithm in a Kubernetes cluster system according to the present disclosure.

Referring to FIG. 3, a preferred embodiment of the present disclosure is performed as follows:

In step 1), kublectl sends a Pod creation request to the Kubernetes cluster; it is confirmed through authentication whether the creation request is valid; if the Pod creation request is valid, the Api Server creates a corresponding Pod. At the same time, all creation information is persistently stored in the distributed storage database etcd.

The controller and scheduler in the Master access the Api Server to query Pod creation information. When there is a new creation object, the controller is responsible for obtaining related parameters such as a development dependency library, and system configurations required by the Pod, generating a Pod scheduling task based on the parameters, sending the Pod scheduling task to the scheduler, and adding the Pod scheduling task to a pending queue. The controller serializes the Pod scheduling task as an object and sends it to the scheduler. The scheduler checks the validity of the object.

Furthermore, the step that the controller serializes the Pod scheduling task as an object and sends it to the scheduler includes:

based on the tasks to be scheduled in the etcd, obtaining submission time $A_i$ and a deadline constraint $D_i$ of a task Wi, calculating a critical path length $CP_i$ and calculating a task priority index defined as:

$$\alpha_i = \frac{D_i - A_i}{CP_i};$$

wherein the smaller the value $\alpha_i$, the closer $CP_i$ of the task is to $D_i - A_i$, i.e., the scheduling task is more urgent and needs to be prioritized; $CP_i$ is mainly used to predict a Pod task running time based on the cpu and memory resources provided by the node.

The tasks to be scheduled in the etcd are sorted in descending order based on this value to form a first-in-first-out queue, and then the tasks to be scheduled are passed to the scheduler in the queue order.

In step 2), the scheduler accesses the Api Server to obtain a scheduling event. If a new scheduling event is found in the first-in-first-out queue, the scheduler executes the scheduling process. If no new scheduling request is collected, no operation is executed and the scheduler continues to wait for the next round of notification query.

During executing the scheduling, a set of filtering algorithms are invoked first to filter all the nodes in the cluster based on the scheduling event information obtained from the cache of the scheduler, to obtain server nodes capable of running the task. Here, the filtering is performed according to the default filtering algorithm of Kubernetes, which mainly includes the following five steps:

2-1) PodFitsPorts: It is checked whether ports requested by the Pod are in conflict with ports that are already in use, that is, whether the ports required by the Pod are occupied, and the node is filtered out if the ports are occupied, i.e., the ports are already in use.

2-2) PodFitsResources: It is checked whether the resources required by the Pod are satisfied, i.e. it is checked whether main feature requirement fields of the Pod, such as CPU, memory, IO resources and network resources are satisfied, and the node is filtered out if the resources are not satisfied.

2-3) NoDiskConflict: It is checked whether a disk volume label on the node is in conflict with a disk volume label in the Pod, and filter out the node if there is a conflict.

2-4) PodSelectorMatches: If the Pod specifies a NodeSelector attribute, nodes that match the PodNodeSelector attribute are picked up; and it is checked whether the node specified by the node selector or node affinity of the Pod matches the node to be examined.

2-5) PodCFitsHost: If the Pod specifies a HostName, nodes matching the HostName are picked up.

Each server node in the list of server nodes capable of running the task is then scored, where the score ranges from 0 to 10. The final scheduling result indicates the server node with the highest score, which is then bound to the task, and the name of the final scheduling node is written into a server node name field.

The scoring process is as follows.

It is determined whether the current scheduling event is a computing-intensive service or an ordinary service based on a Pod type and resource requirements. The Pod type is determined based on resource requirement type of the Pod. If the resource requirement information required by the Pod scheduling task contains only computing resources such as cpu and memory, the Pod scheduling task is a computing-intensive service. If the resource requirement information required by the Pod scheduling task contains a variety of complex resource types, such as a combination of diverse resources such as cpu, memory, i/o read/write rate, network bandwidth, graphics card, and hard disk, the Pod scheduling task is an ordinary service.

If the Pod scheduling task is a computing-intensive service, each server node in the cluster is scored based on resource (CPU and memory) idleness and the score defined as follows is recorded:

$$score = \frac{10cpu(capacity - sum(requested))}{capacity} + \frac{10memory(capacity - sum(requested))}{2capacity};$$

where cpu denotes CPU idleness, memory denotes memory idleness, capacity denotes a total amount of resources corresponding to the server node, and requested denotes the amount of resources occupied by other running tasks of the server node, which are all known.

A resource priority scoring policy in the default scheduler is used herein. The resource priority approach is actually for selecting a node with the largest amount of idle resources (CPU and Memory) in the cluster. After each available server node in the cluster is scored according to the above scoring criteria, the server node with the highest score is an optimal server node that is finally bound to the Pod. Since computing-intensive services often require a large amount of support from CPU and memory, resource-intensive tasks can be processed in a fast and efficient way by using the resource priority scoring policy.

In the case of an ordinary service, a resource weight list is automatically generated based on the resource requirements of the scheduled task, and each server node in the cluster is dynamically scored based on the resource weight list and coefficients. Since the resource requirements are diverse, the resource types are ignored herein. Elements having large weights in the task requirements and affecting the task performance are found out, to generate a multidimensional resource weight list.

It is assumed that the sequence of Pod tasks to be scheduled is as follows:

$P=[p_1, p_2, p_3 \ldots p_n]$;

where $p_i$ (i=1, 2 ... n) denotes the $i^{th}$ Pod task to be scheduled.

The server nodes in the cluster are as follows:

$N=[n_1, n_2, n_3 ... n_k]$, where k represents the number of server nodes.

A list of resource types required by the Pod task sequence is as follows:

$T=[t_1, t_2 ... t_n]$;

where $t_i$ (i=1, 2 ... n) denotes resource types required by the $i^{th}$ Pod task to be scheduled.

Resource priorities of the server nodes in the cluster are as follows:

$G=[G_1, G_2 ... G_k]$;

where $G_i$ (i=1, 2 ... k) denotes a resource priority of the $i^{th}$ server node.

The resource quota for each server node is determined based on the resource requirements of the tasks in the work task flow, with a resource weight factor defined as follows:

$$C_i = \begin{bmatrix} c_1 \\ c_2 \\ ... \\ c_s \end{bmatrix};$$

where $c_j$ (j=1, 2 ... s) is the weight factor of the $j^{th}$ resource in the server node, s is the total number of resource types in the server node, and the resources include cpu, memory, i/o read/write rate, network bandwidth, graphics card, hard disk, etc. $c_i$ can be set dynamically according to the task requirements, and a resource type with higher requirements corresponds to a larger resource weight factor, and a resource type with lower requirements corresponds to a smaller resource weight factor.

By dynamically adjusting the resource weight factor, the weight of each type of resources in the priority evaluation can be controlled.

Resource priority: when a new task container is scheduled to a node, the resource priority of this node is determined by a ratio of idle resources of the node to the total capacity, i.e., a ratio of the total amount of resources minus the amount of the used resources on the node minus the amount of resources scheduled for the new task to the total amount of resources, which is calculated as follows:

$$W_{ij} = T_{ij} - T_{ijused} - T_{ijreq};$$

$$G_i = \frac{W_{ij} * C_i}{s};$$

wherein $T_{ij}$ denotes a total amount of type-j resources of the $i^{th}$ server node in the cluster, $W_{ij}$ denotes a priority of the type-j resources of the $i^{th}$ server node in the cluster, $T_{ijused}$ denotes a total amount of the type-j resources consumed by deployed Pods and other applications of the $i^{th}$ server node in the cluster, $T_{ijreg}$ denotes the amount of type-j resources requested by a current Pod task to be scheduled, and $G_i$ denotes a resource priority of the $i^{th}$ server node, which is a total of priorities of all resource types, and a greater value of the ratio indicates a higher priority of the node, where i=1, 2 ... k, and j=1, 2 ... s.

Resource Balance: a relative ratio of various types of resources of an idle node. This setting is mainly to avoid Pod being deployed on nodes with unbalanced node resources, and is also a means to avoid that one type of resources on the node is used up while another type of resources remains a lot. A node with better resource balance is more likely to be selected. A reference formula for two-dimensional resource balance is defined as follows:

$$B=1-\text{abs}(W_{cpu}-W_{mem}).$$

This formula is mainly used to calculate a relative ratio of cpu to memory of the node, so as to select a node with the optimal resource balance among all the nodes to be scheduled, thus avoiding the situation that a large amount of CPU has been allocated while a large amount of memory remains on a node. A formula for evaluating multidimensional resource balance is defined as follows in the present disclosure.

$$B_i = \frac{\sum_{j=1}^{S}\sum_{l=1}^{S}[1 - \text{abs}(W_{ij} - W_{il})]}{S*S};$$

wherein $B_i$ denotes resource balance of the $i^{th}$ server node.

Then, based on a combination of the resource priority and the resource balance, each server node is scored:

$$S_{corei}=K(G_i+B_i)$$

where K is +1 or −1, indicating a result after the filtering process; K=+1 if the server node remains after the filtering process, and K=−1 if the server node is filtered out. A negative value of $S_{corei}$ indicates that the node is not available; a positive value of $S_{corei}$ indicates that the node is available.

Finally, the server node with the highest score is selected.

In step 3), the above steps are repeated until the list of tasks to be scheduled is empty.

When the default scheduler deploys the physical nodes on which Pods run, it usually takes memory and CPU as important index parameters to measure the performance of various nodes. Based on these two factors, the nodes are scored and ranked. Various optimizations of the default scheduling algorithm are only added index parameters such as network load, IO read speed, ignoring the diversity of resource requirements of various services in the service task group. Generally, various types of services have different index parameters. The scheduling policy for the multidimensional resource scheduling cluster is not limited to the resource types; a preferred resource requirement list is selected according to a label of the task, and nodes are scored according to different resource requirements. During scheduling and deployment of Pods, static scheduling can keep load of the cluster relatively balanced. However, after a long-time operation of the cluster, the cluster system will have the problem of unbalanced load. Therefore, in the scheduling process, a dynamic load balancing mechanism is also used, and the stable balance of the cluster system is maintained by using a dynamic weight factor during long-time operation, so as to better maintain the stability of the cluster system.

Each embodiment in the present specification is described in a progressive manner, each embodiment focuses on the differences from other embodiments, and the same and similar parts among the embodiments can be referred to each other.

The principles and implementations of the present disclosure have been described herein with specific examples, and the above embodiments are presented to aid in the understanding of the method and core principles of the present disclosure. In addition, those of ordinary skill in the art can make various modifications in terms of specific implementations and scope of application in accordance with the teachings of the present disclosure. In conclusion, the content of the present description shall not be construed as limiting the present disclosure.

What is claimed is:

1. A multidimensional resource scheduling method in a Kubernetes cluster architecture system, comprising:
   initiating Pod creation requests;
   obtaining parameters required by Pods to generate Pod scheduling tasks;
   serializing the Pod scheduling tasks as objects to send to a scheduler; and
   binding each Pod scheduling task in the scheduler to a target node for execution;
   wherein the binding each Pod scheduling task in the scheduler to the target node for execution comprises:
   performing a feasibility check on server nodes, to pick out server nodes capable of running the Pod scheduling task;
   scoring the server nodes capable of running the Pod scheduling task; and
   binding the Pod scheduling task to a server node with a highest score;
   wherein the scoring the server nodes capable of running the Pod scheduling task comprises:
   determining whether a current Pod scheduling task event is a computing-intensive service or an ordinary service;
   scoring each server node in the cluster according to CPU idleness and memory idleness if the current Pod scheduling task event is the computing-intensive service;
   scoring each server node in the cluster according to resource requirements of the Pod scheduling task, a resource priority of each server node, and resource balance of each server node if the current Pod scheduling task event is the ordinary service;
   wherein the scoring each server node in the cluster according to the resource requirements of the Pod scheduling task, the resource priority of each server node, and the resource balance of each server node comprises:
   calculating the resource priority of each server node as follows:

$$W_{ij} = T_{ij} - T_{ijused} - T_{ijreq};$$

$$G_i = \frac{W_{ij} * C_i}{s};$$

wherein $T_{ij}$ denotes a total amount of type-j resources of an $i^{th}$ server node in the cluster, $W_{ij}$ denotes a priority of the type-j resources of the $i^{th}$ server node in the cluster, $T_{ijused}$ notes a total amount of the type-j resources consumed by deployed Pods and other applications of the $i^{th}$ server node in the cluster, $T_{ijreq}$ denotes an amount of the type-j resources requested by a current Pod task to be scheduled, $G_i$ denotes a resource priority of the $i^{th}$ server node, $C_i$ denotes a resource weight factor of the $i^{th}$ server node, i=1, 2... k, j=1,2... s, k denotes a number of the server nodes, s denotes a total number of resource types in the server node, and the resource types comprise cpu, memory, i/o read/write rate, network bandwidth, graphics card and hard disk;

calculating the resource balance of each server node:

$$B_i = \frac{\sum_{j=1}^{S}\sum_{l=1}^{S}[1 - \text{abs}(W_{ij} - W_{il})]}{S * S};$$

wherein $B_i$ represents the resource balance of the $i^{th}$ server node; and
scoring each server node:

$$S_{corei} = K(G_i + B_i)$$

wherein $S_{corei}$ denotes a score of the $i^{th}$ server node, K is +1 or −1, indicating a result after a filtering process, K=+1 if the server node remains after the filtering process, K=−1 if the server node is filtered out a negative value of $S_{corei}$ indicates that the server node is not available, and a positive value of $S_{corei}$ indicates that the server node is available.

2. The multidimensional resource scheduling method in a Kubernetes cluster architecture system according to claim 1, wherein the initiating the Pod creation requests comprises:
   initiating a request via a kubectl client command line;
   creating a Pod request by a controller for making up copies; and
   initiating an external request by an Api Server.

3. The multidimensional resource scheduling method in a Kubernetes cluster architecture system according to claim 1, further comprising:
   authenticating the Pod creation requests and sending the Pod creation requests to an Api Server of a cluster master node for the Api Server to create corresponding Pods.

4. The multidimensional resource scheduling method in a Kubernetes cluster architecture system according to claim 3, further comprising:
   persistently storing all Pod creation information in a distributed storage database etcd.

5. The multidimensional resource scheduling method in a Kubernetes cluster architecture system according to claim 1, wherein the serializing Pod scheduling tasks as objects to send to a scheduler comprises:
   calculating priority indexes of the Pod scheduling tasks, sorting the Pod scheduling tasks in descending order according to the priority index to form a first-in-first-out queue, and sending the Pod scheduling tasks to the scheduler according to a sequence of the queue;
   wherein each priority index is calculated as follows:

$$\alpha_i = \frac{D_i - A_i}{CP_i};$$

wherein $\alpha_i$ denotes the priority index of an $i^{th}$ Pod scheduling task, $D_i$ denotes a deadline constraint of the $i^{th}$ Pod scheduling task, $A_i$ denotes submission time of the $i^{th}$ Pod scheduling task, and $CP_i$, denotes a critical path length of the $i^{th}$ Pod scheduling task.

6. The multidimensional resource scheduling method in a Kubernetes cluster architecture system according to claim 1, wherein the server nodes are picked out by using a default filtering algorithm of Kubernetes:
   filtering out server nodes on which ports required by the Pod have been occupied,
   filtering out server nodes that cannot meet resources required by the Pod, filtering out server nodes that conflict with a disk volume label in the Pod, and picking out server nodes matching a Pod NodeSelector attribute and HostName.

7. The multidimensional resource scheduling method in a Kubernetes cluster architecture system according to claim 1, wherein the scoring each server node in the cluster according to resource idleness comprises:

defining a score of the server node as:

$$\text{score} = \frac{10\text{cpu}(\text{capacity} - \text{sum}(\text{requested}))}{\text{capacity}} + \frac{10\text{memory}(\text{capacity} - \text{sum}(\text{requested}))}{2\text{capacity}};$$

wherein score denotes a score of the server node, cpu denotes CPU idleness, memory denotes memory idleness, capacity denotes a total amount of resources corresponding to the server node, and requested denotes an amount of resources occupied by other running tasks of the server node.

* * * * *